June 15, 1971   D. A. LARSON   3,584,372
METHOD OF JOINING REFRACTORY METAL MEMBERS
Filed May 14, 1968

WITNESSES:
Bernard R. Gieguay
James F. Young

INVENTOR
Daniel A. Larson
BY
Blair R. Studebaker
ATTORNEY

United States Patent Office 3,584,372
Patented June 15, 1971

3,584,372
METHOD OF JOINING REFRACTORY METAL MEMBERS
Daniel A. Larson, Cedar Grove, N.J., assignor to Westinghouse Electric Corporation, Pittsburgh, Pa.
Filed May 14, 1968, Ser. No. 728,943
Int. Cl. B23k 31/02, 35/38
U.S. Cl. 29—494
1 Claim

ABSTRACT OF THE DISCLOSURE

A method for sealing the niobium end cap of a ceramic arc tube to the tantalum exhaust and fill tubulation comprising the steps of: placing the tubulation through a close fit aperture in the end cap, positioning a niobium or titanium ring over the tubulation in a position contacting both the end cap and the tubulation at their juncture, and passing sufficient electric current through the tubulation to cause the ring to melt and seal the end cap to the tubulation.

BACKGROUND OF THE INVENTION

The ceramic bodied arc discharge lamp is a new and a promising source of illumination for the lamp industry. In manufacturing this type of lamp, however, many material and process problems, new to the industry, are now confronting the lamp manufacturers. The ceramic bodied arc lamp generally consists of a ceramic body or envelope, tubular in cross-section, closed off at each end by a refractory metal end disc or cap. These end discs or caps generally carry the opposed discharge sustaining electrodes within the arc tube. After the end discs or caps are sealed to the ceramic envelope, the envelope must be exhausted and filled with a discharge sustaining filling of, for example, elements such as mercury, argon and/or sodium to name only a few of the possible discharge sustaining constituents. In order to accomplish this exhausting and filling process, at least one of the end caps or discs must carry a short length of refractory metal tubulation which extends through the end cap or disc to provide the necessary access to the interior of the sealed lamp body.

Several methods have been employed with varying degrees of success in joining the refractory metal exhaust and fill tubulation, generally tantalum, to the refractory metal end cap or disc which is normally niobium. One such method was a titanium braze, the braze being accomplished by R.F. heating under vacuum conditions.

When it appeared desirable to eliminate the titanium at the joint between the end cap and the tubulation for certain applications, success was achieved by fabricating the end cap with a small collar which surrounded the tantalum tubing for about 2 millimeters. This small collar was melted in a vacuum using an electron beam welder to make the seal. Both this method and the titanium braze method have been found in some instances, to be difficult, time consuming and require expensive equipment.

In order to produce the ceramic bodied arc discharge lamp, it was necessary to find a method of sealing the refractory metal end cap to the refractory metal tubulation in a manner which was simple, inexpensive and adapted to high speed production techniques.

SUMMARY OF THE INVENTION

This invention relates to the sealing of refractory metal members and more particularly to the hermetic sealing of niobium end caps or discs to tantalum exhaust and fill tubulation in the manufacture of ceramic arc discharge lamps.

It is an object of this invention to provide a method for sealing a refractory metal tube through an aperture in a refractory metal disc.

Another object of this invention is to provide a method for sealing a length of tantalum exhaust tubulation through an aperture in a niobium end closure member for a ceramic discharge lamp.

Yet another object of the present invention is to provide a simple and effective method for sealing the refractory metal exhaust tubulation to the refractory metal end cap of a ceramic discharge lamp, which method is susceptible to high speed manufacturing methods.

The foregoing objects are accomplished in accordance with the present invention by positioning the higher melting point refractory metal tubing within the aperture in the lower melting point refractory metal member with a substantially slide fit, positioning a lower melting point metal ring about the higher melting point refractory metal tubing adjacent the juncture of the tubing and the member and passing sufficient electric current through the tubing to cause the ring to melt and flow into and around the juncture of the tubing and the member to thereby hermetically seal the member to the tubing at said juncture.

BRIEF DESCRIPTION OF THE DRAWING

The foregoing objects, and others, along with many of the attendant advantages of the present invention will become more readily apparent and better understood as the following detailed description is considered in connection with the accompanying drawings, in which.

DESCRIPTION OF THE PREFERRED EMBODIMENT

Figure 1:
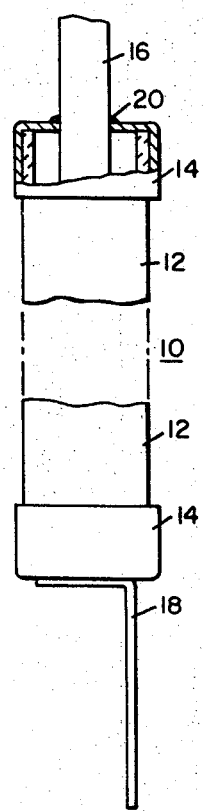
FIG. 1 is an elevational view of a typical ceramic arc tube with a portion of the end cap broken away.

Referring now in detail to the drawing in which like reference characters represent like parts throughout the several views, there is illustrated in FIG. 1 a typical ceramic discharge lamp which illustrates one purpose for which the sealing method of the present invention may be employed. The ceramic discharge lamp generally designated 10 includes a tubular polycrystalline alumina body member 12 closed at each end by an end cap or end closure member 14. At least one end of the ceramic arc tube carries a length of exhaust and fill tubulation 16 which serves as a lead-in conductor and extends through the end closure member 14. The tubulation 16 carries at its inner end one of the arc sustaining electrodes (not shown). Generally at the other end a simple, flexible refractory metal strap as illustrated at 18 is employed as the lead-in conductor and the other of the arc sustaining electrodes is mounted on the inside of the lower closure member 14 on a similar refractory metal strap (not shown).

One of the principal problems that have confronted lamp manufacturers in the manufacture of ceramic discharge lamps is the various seals that are required between the parts. The seals must be vacuum tight, able to withstand extremely high temperatures (in excess of 1000° C.) and must also be able to withstand attack from the alkali metal vapors sometimes employed in the discharge sustaining fill. One seal which has presented a problem prior to the instant invention is the seal at 20 between the end cap and the exhaust tubulation.

Figure 2:
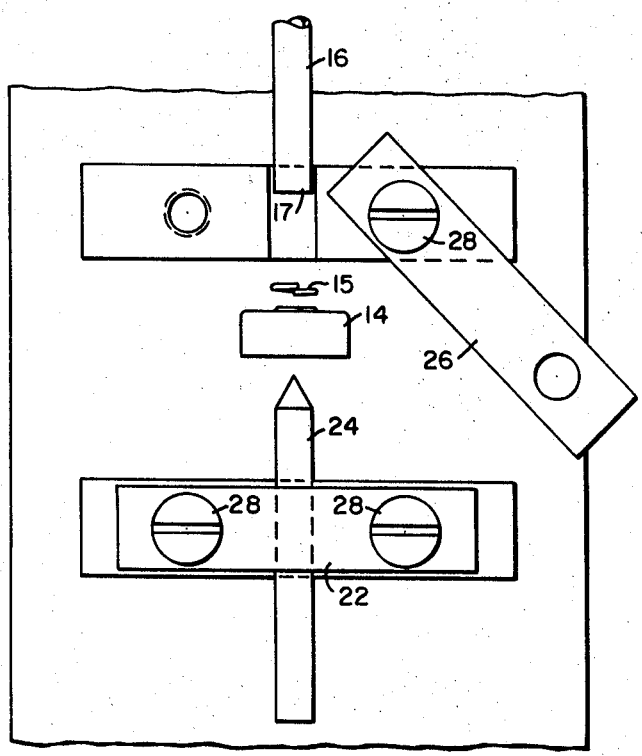
FIG. 2 is a front plan view of one form of a fixture capable of practicing the method of the present invention and illustrating the parts prior to assembly.
Figure 4:
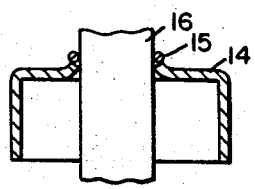
FIG. 4 is a blown-up view of the assembled parts prior to sealing with the ring and end cap in section.
Figure 5:
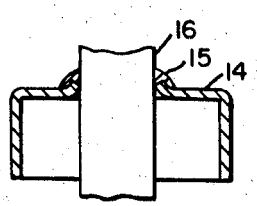
FIG. 5 is an enlarged view similar to FIG. 4 illustrating the assembly after sealing.
Figure 3:
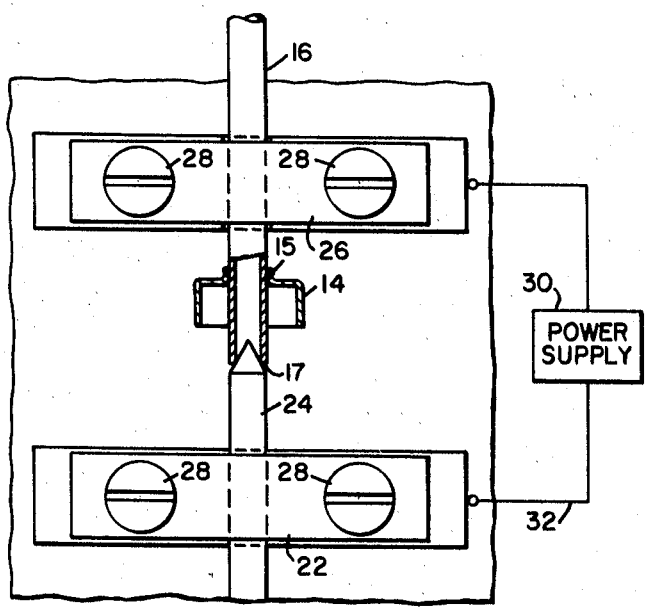
FIG. 3 is a front plan view similar to FIG. 2 with the parts assembled in preparation for sealing.

Referring now to FIGS. 2 through 5, the method of the present invention will be described in detail. As illustrated in FIG. 2, the fixture includes a lower clamping bar 22 which retains locating pin 24 in position to receive the tantalum tubulation. A refractory metal end cap 14 and ring 15 having a melting point lower than the melting point of the refractory metal exhaust tubulation 16 are both slipped over the end of the exhaust tubulation 16 and the end cap 14 positioned at the desired height above the end 17 of the exhaust tubulation. The metal ring 15 overlies the juncture between the higher melting point refractory metal exhaust and fill tubulation and the lower melting point refractory metal end cap as illustrated in FIGS. 3 and 4. The metal ring 15 must be of a lower melting point metal than the tubulation and have no higher melting point than the end cap. The lower end 17 of the exhaust and fill tubulation is then positioned on the tapered top end of locating pin 24 and upper clamping bar 26 closed and secured by one of the securing members or bolts 28. With the assembly in the position indicated in FIG. 3, the power supply 30 is actuated causing a current to flow through the higher melting point refractory metal tubulation causing the lower melting point metal ring 15 to heat to a temperature above its melting point thereby causing it to melt and flow around the tubulation and over the end cap in the area adjacent to the tubulation thus effecting a hermetic seal between the end cap and tubulation, as illustrated in FIG. 5.

It is common practice to employ 15 mil wall thickness ⅛" O.D. tantalum tubing as the exhaust and fill tubulation for ceramic discharge lamps. It is also common that the end cap be constructed of niobium. As a specific example, when a niobium or titanium ring 15 and a niobium end cap 14 are positioned on a piece of ⅛" O.D. tantalum exhaust tubulation, a current of about 200 amps. for several seconds provides an excellent seal between the tantalum tubulation and niobium end cap. The current is provided by the power supply 30 which generally includes a high current transformer and is connected to a 110 volt power line. The 110 volt line is connected to a variac and 10:1 stepdown transformer which supplies approximately 8 volts through the line 32 and 200 amps. to the tantalum tubulation. The currents required are, of course, dependent on the size of the tantalum tube. It is preferable that the sealing take place in a vacuum or an inert atmosphere to eliminate the adverse affects of oxidation. One method which has proved successful is to accomplish the sealing in flowing commercial grade argon at about atmosphere pressure.

It is preferable that the ring 15 be constructed of titanium; however, for some applications for example where alkali-metal vapors will be encountered, it is preferred that the ring 15 be constructed of niobium.

Although a specific embodiment has been described in detail and a particular fixture for practicing the method has been disclosed, it should be understood that the sealing technique of the present invention is not limited thereto or thereby and can be readily practiced in other modes and is particularly adapted to high speed, rapid assembly production techniques necessary in the production of commercially successful lamps.

Since various changes may be made in the above-described method, without departing from the spirit thereof, it is intended that all matter contained in the foregoing description or shown in the accompanying drawings, shall be interpreted as illustrative and not in a limiting sense.

What is claimed is:

1. The method of sealing a niobium end cap of a ceramic arc tube to the tantalum exhaust and fill tubulation comprising the steps of:

inserting the tantalum tubulation through a close fit aperture in the niobium end cap;

positioning a ring of niobium or titanium over the tantalum tubulation in a position contacting both the end cap and the tubulation at their juncture;

placing the tubulation carrying the niobium end cap and ring in an electrically conductive holding fixture disposed in an inert atmosphere; and passing sufficient electric current through the tubulation to cause the ring to melt and seal the end cap to the tubulation.

References Cited
UNITED STATES PATENTS

| | | | |
|---|---|---|---|
| 2,174,218 | 9/1939 | Greene | 219—85X |
| 2,448,329 | 8/1948 | Schwinn | 219—85 |
| 2,607,981 | 8/1952 | Nelson | 29—504X |
| 2,813,218 | 11/1957 | Klopping et al. | 219—85X |
| 3,147,089 | 9/1964 | Chyle | 29—504X |
| 3,293,741 | 12/1966 | Gilliland | 29—504X |

OTHER REFERENCES

Brazing Manual, prepared by American Welding Society, New York, 1955, pp. 64–65, 70–73.

Schwartz, "Brazing of Sandwich Structures of Columbium Alloys," welding Journal, April 1961, pp. 377–382.

Slaughter et al., "Welding and Brazing of High Temperature Radiators and Heat Exchangers," Welding Journal, January 1968, pp. 17–18.

Stone et al., "Brazing Alloys and Techniques for Tantalum Honeycomb Structures," Welding Journal, Research Supplement, August 1967, pp. 343s–350s.

JOHN F. CAMPBELL, Primary Examiner

R. J. SHORE, Assistant Examiner

U.S. Cl. X.R.

29—498, 500, 504; 219—85